US012718662B2

(12) United States Patent
Chamberlain

(10) Patent No.: US 12,718,662 B2
(45) Date of Patent: Aug. 25, 2026

(54) SLOTMASTERS

(71) Applicant: HungryBear Gaming Ltd., Knowle (GB)

(72) Inventor: Justin Douglas Chamberlain, Knowle (GB)

(73) Assignee: Hungry Bear Gaming Ltd., Knowle (GB)

( * ) Notice: Subject to any disclaimer, the term of this patent is extended or adjusted under 35 U.S.C. 154(b) by 449 days.

(21) Appl. No.: 18/083,407

(22) Filed: Dec. 16, 2022

(65) Prior Publication Data

US 2023/0206725 A1 Jun. 29, 2023

Related U.S. Application Data

(60) Provisional application No. 63/318,333, filed on Mar. 9, 2022, provisional application No. 63/290,755, filed on Dec. 17, 2021.

(51) Int. Cl.
*G07F 17/32* (2006.01)

(52) U.S. Cl.
CPC ...... *G07F 17/3265* (2013.01); *G07F 17/3274* (2013.01); *G07F 17/3276* (2013.01)

(58) Field of Classification Search
CPC ............. G07F 17/3262; G07F 17/3265; G07F 17/3272; G07F 17/3276
See application file for complete search history.

(56) References Cited

U.S. PATENT DOCUMENTS

| | | | | |
|---|---|---|---|---|
| 9,418,521 B1 * | 8/2016 | Henrick | G07F 17/3244 | |
| 10,089,832 B2 * | 10/2018 | Takahashi | G07F 17/34 | |
| 11,798,374 B2 * | 10/2023 | Andrews | G07F 17/3258 | |
| 2007/0238530 A1 * | 10/2007 | Okada | G07F 17/32 | 463/42 |
| 2009/0088253 A1 * | 4/2009 | Oberberger | G07F 17/3276 | 463/42 |
| 2010/0113162 A1 * | 5/2010 | Vemuri | G07F 17/3267 | 463/43 |
| 2010/0120521 A1 * | 5/2010 | Caputo | G07F 17/3244 | 463/26 |
| 2010/0197385 A1 * | 8/2010 | Aoki | G07F 17/3225 | 463/31 |
| 2010/0216536 A1 * | 8/2010 | Gagner | G07F 17/3267 | 463/16 |
| 2014/0024437 A1 * | 1/2014 | Vann | G07F 17/3279 | 463/25 |
| 2014/0031105 A1 * | 1/2014 | Givant | G07F 17/3276 | 463/25 |
| 2014/0038709 A1 * | 2/2014 | Earley | G07F 17/3272 | 463/31 |
| 2014/0243068 A1 * | 8/2014 | Cibulski | G07F 17/3276 | 463/20 |

(Continued)

*Primary Examiner* — Chase E Leichliter
(74) *Attorney, Agent, or Firm* — ONE LLP

(57) ABSTRACT

Some embodiments relate to a method within a game of chance. The method includes receiving a bet from a first player and receiving a bet from a second player. The second player is allowed to take an action impacting an outcome of a game of chance for the first player. The method includes determining an outcome for the first player based on a probability of a win of the game of chance for the first player and the action of the second player.

1 Claim, 17 Drawing Sheets

(56) References Cited

U.S. PATENT DOCUMENTS

| | | | | |
|---|---|---|---|---|
| 2014/0256409 | A1* | 9/2014 | Wood | G07F 17/326 463/25 |
| 2014/0295937 | A1* | 10/2014 | Takahashi | G07F 17/34 463/20 |
| 2014/0295938 | A1* | 10/2014 | Takahashi | G07F 17/326 463/20 |
| 2014/0364190 | A1* | 12/2014 | DiMichele | G07F 17/323 463/20 |
| 2016/0225233 | A1* | 8/2016 | Arezina | G07F 17/323 |
| 2017/0200349 | A1* | 7/2017 | Englman | G07F 17/3211 |
| 2017/0345260 | A1* | 11/2017 | Strause | G07F 17/3293 |
| 2019/0026990 | A1* | 1/2019 | Acres | G07F 17/3258 |
| 2019/0035226 | A1* | 1/2019 | Sato | A63F 13/69 |
| 2019/0096194 | A1* | 3/2019 | Oyama | G07F 17/326 |
| 2019/0197820 | A1* | 6/2019 | Caputo | G07F 17/323 |
| 2019/0266846 | A1* | 8/2019 | Seleznov | G07F 17/3276 |
| 2020/0234532 | A1* | 7/2020 | Arashima | G07F 17/3262 |
| 2020/0294352 | A1* | 9/2020 | Cole | G07F 17/3227 |
| 2021/0043041 | A1* | 2/2021 | Thomas | G07F 17/3213 |
| 2021/0049872 | A1* | 2/2021 | Oochi | G07F 17/3281 |
| 2021/0090404 | A1* | 3/2021 | Andrews | G07F 17/3237 |
| 2022/0266133 | A1* | 8/2022 | Mawdesley | G07F 17/3225 |
| 2023/0206725 | A1* | 6/2023 | Chamberlain | G07F 17/3276 463/20 |
| 2024/0096181 | A1* | 3/2024 | Thomas | G07F 17/3267 |
| 2024/0331493 | A1* | 10/2024 | Römer | G07F 17/3227 |

* cited by examiner

SLOTMASTERS

CLAIM OF PRIORITY UNDER 35 U.S.C. § 119

The present application claims priority to U.S. Provisional Patent Application No. 63/290,755, entitled "SLOTMASTERS," filed Dec. 17, 2021, and U.S. Provisional Patent Application No. 63/318,333, entitled "SLOTMASTERS," filed Mar. 9, 2022, both of which are assigned to the assignee hereof and hereby expressly incorporated by reference herein.

TECHNICAL FIELD

The disclosure relates generally to the field of gaming, more specifically, and not by way of limitation, some embodiments are related to slot-based gaming.

BACKGROUND OF THE INVENTION

Current slot machine games do not allow users to interact with other users. Rather, the slot machines are games of chance played against the casino. One player on a slot machine does not have the ability to impact the gameplay of another player on another slot machine. Each game maybe a separate game of chance. In some instances, players may have minimal interaction with each other through an increasing jackpot building based on multiple player betting. For example, the progressive jackpot may grow as more and more players bet over time. The progressive jackpot may occasionally payout to one of the players, which may decrease the progressive jackpot to the rest of the players until the progressive jackpot builds again, e.g., over time. However, the players cannot take steps to impact another player's game directly.

SUMMARY OF THE INVENTION

Provided herein are embodiments of a game of chance. In some embodiments, one player may impact the results of game play of another player by use of a range of offensive and defensive tools available to players which are triggered by a symbol, e.g., a "War Chest" landing within their game window. The player may then select that player's tool of choice, from those available. The player may also select an opposing player to use the selected tool against. The available tools offer the player options such as, though not limited to, the ability to either defend against attack from another player, or attack by methods such as: Freezing some or all of another player's game reels for a defined period, completely or partially removing another player's points balance or stealing all or some of another player's balance and adding the balance to the player's own points balance. In some embodiments, a group of players may impact the results of game play of another player of players by working together in a similar way.

Some embodiments relate to a method within a game of chance. The method includes receiving a bet from a first player and receiving a bet from a second player. The second player is allowed to take an action impacting an outcome of a game of chance for the first player. The method includes determining an outcome for the first player based on a probability of a win of the game of chance for the first player and the action of the second player.

Disclosed are example embodiments of a gambling system. The gambling system includes comprising a processor and a memory. The memory is coupled to the processor. The memory includes instructions causing the processor to receive a bet from a first player, receive abet from a second player, wherein the second player is allowed to take an action impacting an outcome of a game of chance for the first player, and determine an outcome for the first player based on a probability of a win of the game of chance for the first player and the action of the second player.

The features and advantages described in the specification are not all-inclusive. In particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the disclosed subject matter.

BRIEF DESCRIPTION OF THE DRAWINGS

The present invention may be better understood by referring to the following figures. The components in the figures are not necessarily to scale. Emphasis instead being placed upon illustrating the principles of the disclosure. In the figures, reference numerals designate corresponding parts throughout the different views.

Figure 1:
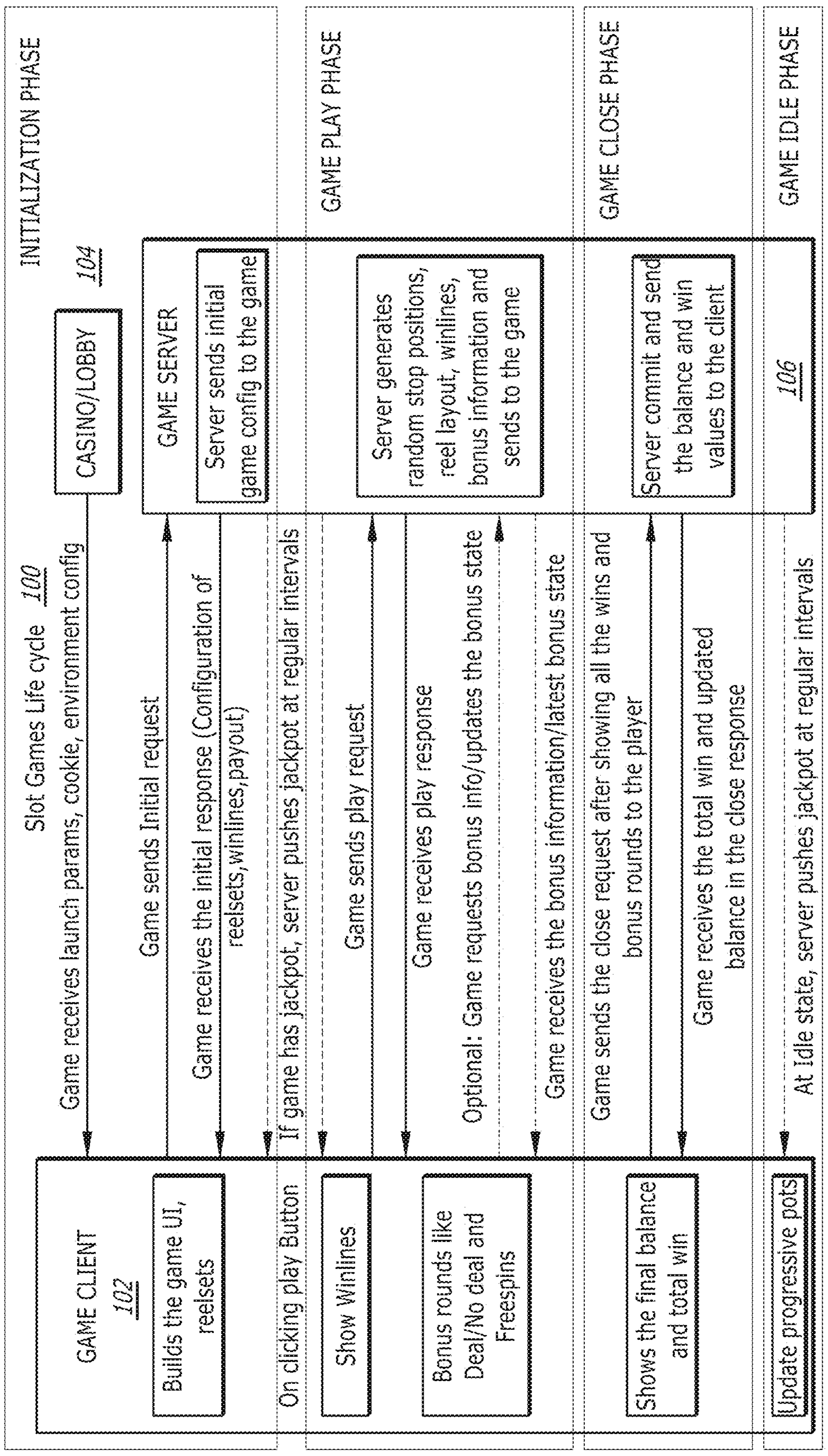
FIG. 1 illustrates an example of slot games life cycle including background polling of a server or engine that may be carried out by the game client only for current status of associated jackpots or specific game bonus features.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

DETAILED DESCRIPTION

The detailed description set forth below in connection with the appended drawings is intended as a description of configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of gambling systems and gambling devices will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In an example embodiment, SlotMasters Technology may be a method, via modification and enhancement of legacy online gaming client/server/database communication code that may, in some example embodiments, facilitate instant and fully interactive, multiplayer slot game tournaments via web browser and mobile platforms.

In another example embodiment, SlotMasters Technology may be a method, via casino platforms, e.g., through land-based (retail) casino platforms, that may, in some embodiments, facilitate instant and fully interactive, multiplayer slot game tournaments via slots game retail cabinet platforms.

In an example embodiment, SlotMasters may provide three (or more)-way head-to-head slot games, where players may get to affect the outcome of their opponents' score through random events and a degree of skill, by strategically deploying a selection of attack and defensive weapons.

In an example embodiment, SlotMasters may provide head-to-head, real time slot battles, via a lobby and queuing system.

In an example embodiment, player liquidity issues may be overcome with house AI robot players that may be available 24/7.

In an example embodiment, players may be matched randomly based on the queue in the lobby, or against robots where there are no other available players.

In an example embodiment, tournaments may run 24/7 with players allocated a fixed number of game rounds per day, playable at any time.

In an example embodiment, each game round may last for a predetermined duration (e.g., generally 1 to 3 minutes).

In an example embodiment, the game round winner may be the person to hold the highest points score at the end of the round.

In an example embodiment, players may climb leader boards throughout the duration of a tournament.

In an example embodiment, an overall tournament winner may be awarded prizes after completion. The overall tournament winner may be based on total points in some example embodiments. In other embodiments, overall tournament winner may be based on wins and losses or some combination of wins and losses and points.

In an example embodiment, SlotMasters may be used in online (web-based) 'free-to-play', 'real money' or native app-based social casino tournament settings with no change to the base technology.

In an example embodiment, the SlotMasters backend may be a webserver with exposed API (application programming interface). In an example embodiment, the game may run in a browser and may use asynchronous calls (AJAX) to the server to continuously monitor and progress gameplay.

In an example embodiment, there is a backend module for the administrator to setup and manage the games. Game configuration may be done on the server using XML files. API requests and responses may all be JavaScript Object Notation (JSON).

In example embodiments, technologies used may include, but are not limited to Apache webserver, recursive initialism PHP: Hypertext Preprocessor (PHP) programming language, MySQL database server, or other suitable technical stack.

Existing Online Gameplay Vs Slotmasters

Though single player slot games are commonplace alongside multiplayer games such as 'Bingo' with legacy technology that has been in use for several years, there has never been a multiplayer slot game in which a player can see and interact in real time, with a competitor's game window by inhibiting their ability to play and affecting their overall score balance, whilst in play.

| Existing Tournament format: | SlotMasters Format: |
|---|---|
| Tournaments may be played on a strict schedule of fixed start and end times/dates | Players can instantly, at any time, play tournaments against each other or the computer (AI robot(s)), in real time |
| Players may compete for highest score against hundreds/thousands of other players | Players may compete in small groups (3 or more) and achieve an instant outcome at the end of the play period (minutes) |
| | Each game may use offensive and defensive tools, enabling players to enhance their own chances of winning and limiting the ability of competitors to achieve high scores. All in real time |
| If successful, a player may receive cash out prize money or in game points. | Players may redeem points from battles and can exchange them for free plays of real money casino games or other prizes |

Technology

FIG. 1 illustrates an example of slot games life cycle 100 including background polling of a game server 106 or engine that may be carried out by a game client 102 only for current status of associated jackpots or specific game bonus features.

Existing online slot games may be powered through a highly regulated, secure client/server communication functionality. When a player requests a game through an online operator lobby 104, the game client and server/game engine (which can be hosted locally or via remote aggregator game server (RGS)) may be initiated and all communications may be handled via a single cookie or token which may be encrypted to contain relevant details of the operator and that players account. This may also be used to update the players 'wallet' with the deduction of stakes/bets and the deposit of winnings.

In an example embodiment, once game initiation is complete the game can be played, and game related data may be relayed between the game client and server/engine.

In an example embodiment, the game server/engine may retrieve all player wallet details (e.g., wins, opening account balance, closing account balance, etc.) and displays them via the appropriate fields within the game client display.

In an example embodiment, the game server/engine may also connect to a certified random number generator (RNG) to obtain random stop positions for the individual game slot reels and/or the overall result/outcome of that particular game cycle (spin).

In an example embodiment, during play, the game server/engine may record the game client requests (player interaction) and server responses (history) to an associated database for the purposes of customer service queries or disputes.

In an example embodiment, background polling of the server/engine may be carried out by the game client only for current status of associated jackpots or specific game bonus features (see FIG. 1).

In an example embodiment, all communications may relate to this single instance of the game and this specific player details.

In an example embodiment, SlotMasters technology may differ from the existing format in that, though the game presents in a similar way and the player connects to the game in the same way, communication from that point differs.

In an example embodiment, the SlotMasters backend may be a webserver with exposed application programming interface (API). The game may run in a browser and uses asynchronous calls (AJAX) to the server to continuously monitor and progress gameplay. It will be understood that other example embodiment may use other suitable platform to implement the SlotMasters backend.

In an example embodiment, there may be a backend module for the administrator to setup and manage the games. Game configuration may be done on the server using XML, files. API requests and responses may be JSON In an example embodiment, technologies used may include one or more of, an Apache webserver, a PHP programming language, or a MySQL database server. The Apache HTTP Server (ə-PATCH-ee) is a free and open-source cross-platform web server software. PHP is a general-purpose scripting language geared towards web development. MySQL is an open-source relational database management system (RDBMS).

It will be understood that other suitable technologies may be used. For example, if we were to re-code on a different tech stack (e.g., Websockets instead of AJAX/REST); a different web server other than apache, a different database server other than Mysql, and other programming languages other than PHP might be used in some example embodiments.

In an example embodiment, when a player requests a game through an online operator lobby a unique encoded cookie/token, containing only a user ID may be created and directed to the external SlotMasters service. The SlotMasters lobby may be presented to the player via an iFrame displayed on the operator website. It will either ask the player to choose a unique screen name or to register if they have not previously played. The unique identifier may then be used for future visits and to pass all relevant game session data back to the online operator.

In an example embodiment, the game client and Slotmaster server/game engine may only be fully initiated once all players (or AI robots) are present.

In an example embodiment, the server/engine may support all included players from this point, updating all players score balance (wallet) with deduction of lost/stolen points and the addition of game winnings.

In an example embodiment, the only detail visible to players may be their own game alongside their opponents' screen name, game window and current score.

All Interaction

In an example embodiment, once game initiation is complete the game may be played and game related data for all players may be relayed between the game client and server/engine.

In an example embodiment, the server/engine may connect to a random number generator (RNG), e.g., an internal random number generator or an external random number generator, to obtain random stop positions for the individual game slot reels. The server/engine may also produce results/outcomes of individual game cycles for all players and the final result for players' positions in terms of overall score, declaring winners.

In an example embodiment, during play, the systems and methods described herein may record the game client requests (player interaction) and server responses (history) to a single database for the purposes of customer service queries or disputes.

In an example embodiment, these interactions may be recorded as they happen, in real time, per player.

Figure 2:
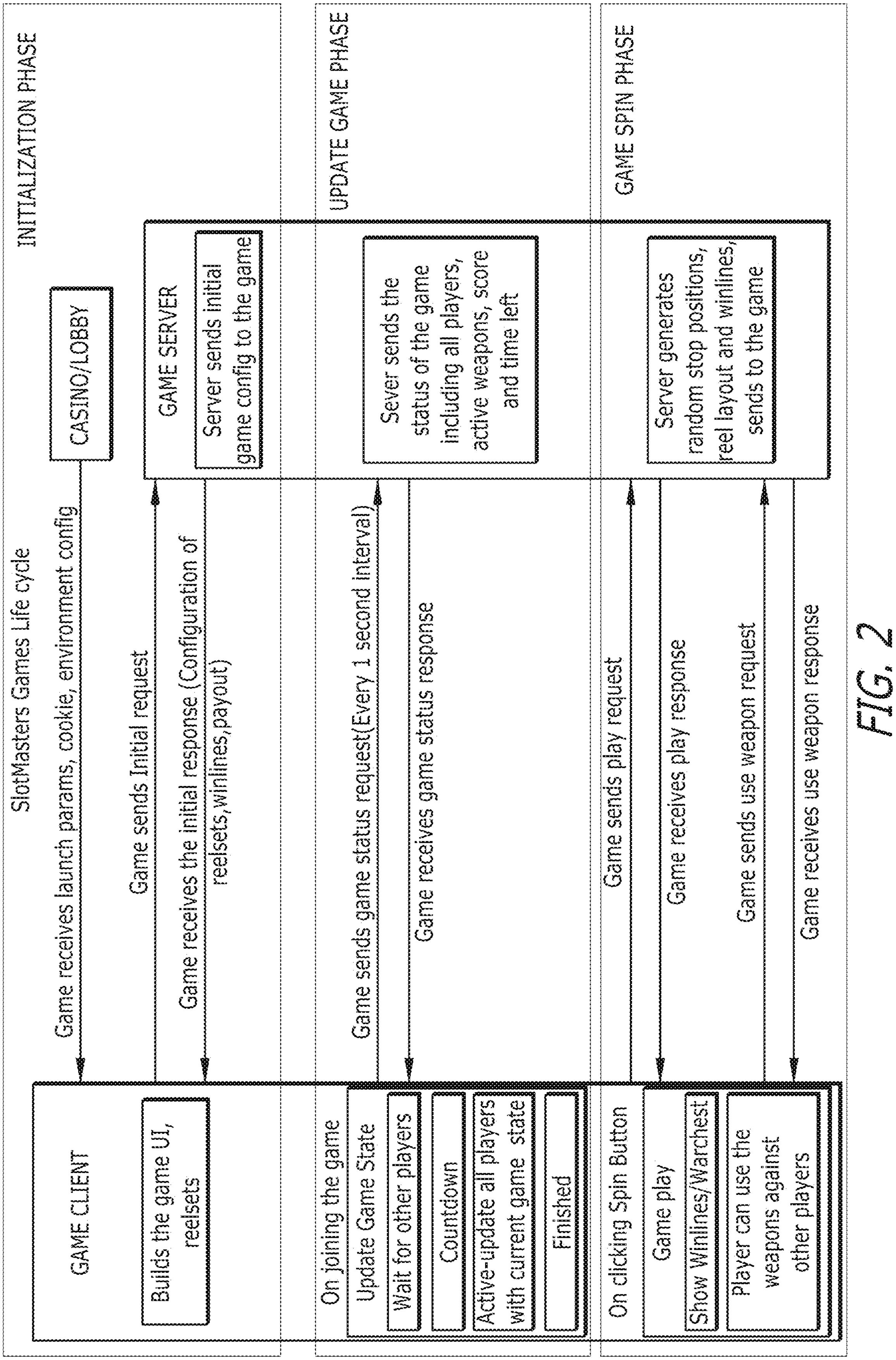
FIG. 2 illustrates an example of slot games life cycle including background polling of the server or engine wherein each player game client may be updated simultaneously in accordance with some embodiments of the present disclosure.

In an example embodiment, background polling of the server/engine may be carried out by the game client every 1 second (or other predetermined timing greater than or less than 1 second) and each player game client may updated simultaneously (see FIG. 2).

In an example embodiment, once an individual game session cycle is complete, details may be returned to the operator via the encoded cookies/tokens and reconciled by them with the each of the relevant player accounts.

Figure 3:
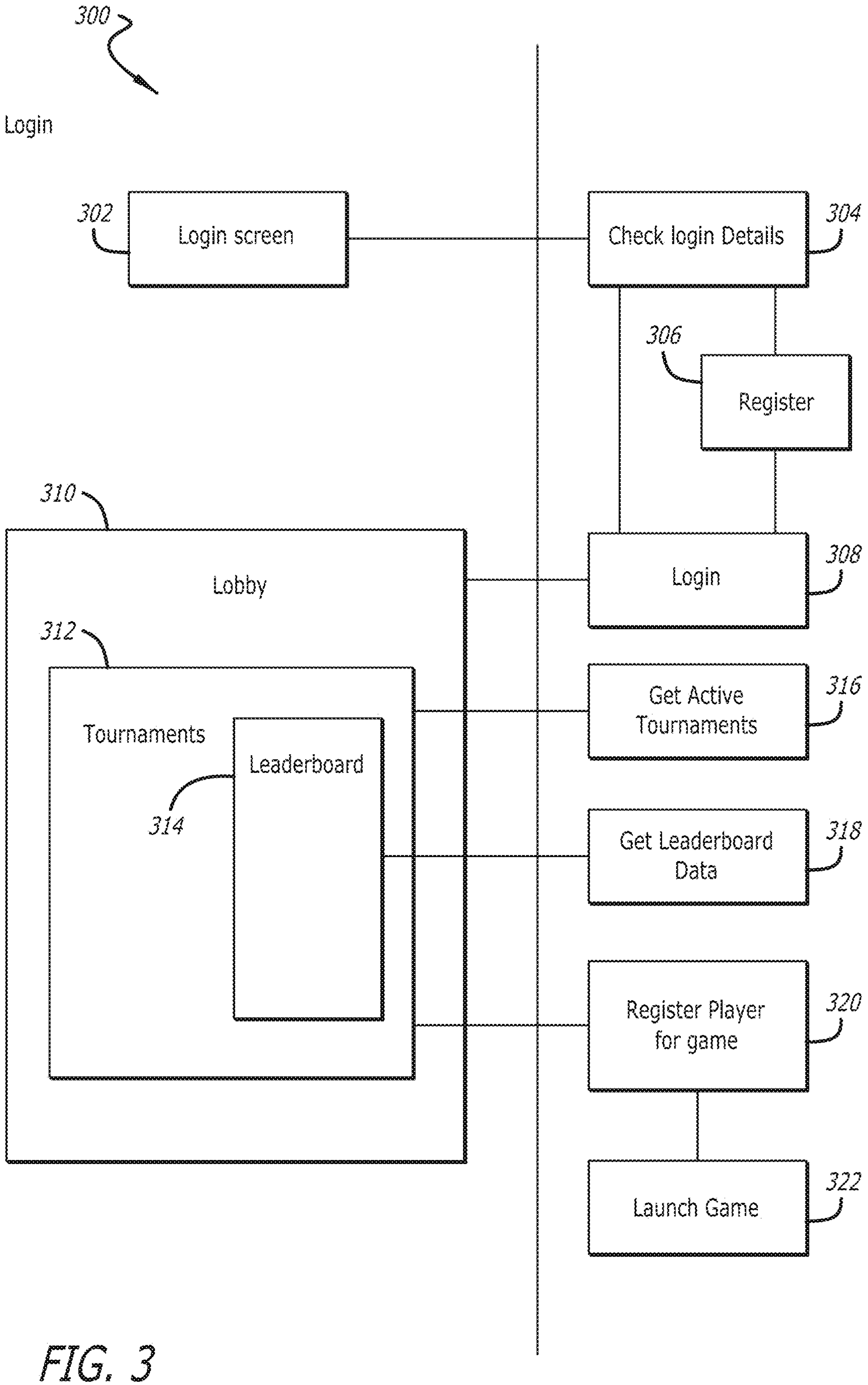
FIG. 3 is a diagram illustrating an example game setup in accordance with some embodiments of the present disclosure.

FIG. 3 is a diagram illustrating an example game setup 300 in accordance with some embodiments of the present disclosure. As illustrated in the figure, from a login screen 302, login details may be checked 304. The login details maybe based on information in a register 306 and the login 308 may lead to a “lobby” 310 of the game. The lobby 310 may be a starting area within the game. From the lobby a user may access various games which may be referred to as tournaments 312. The tournaments 312 may have various leaderboards 314 to indicate a user winning the tournament. As illustrated, tournaments may be accessed using a list of active tournaments 316, e.g., viewable from the lobby. Additionally, a leaderboard database 318 may be received from the computing system. The computing system may register players 320 for a game within the tournament and launch 322 the game.

Figure 4:
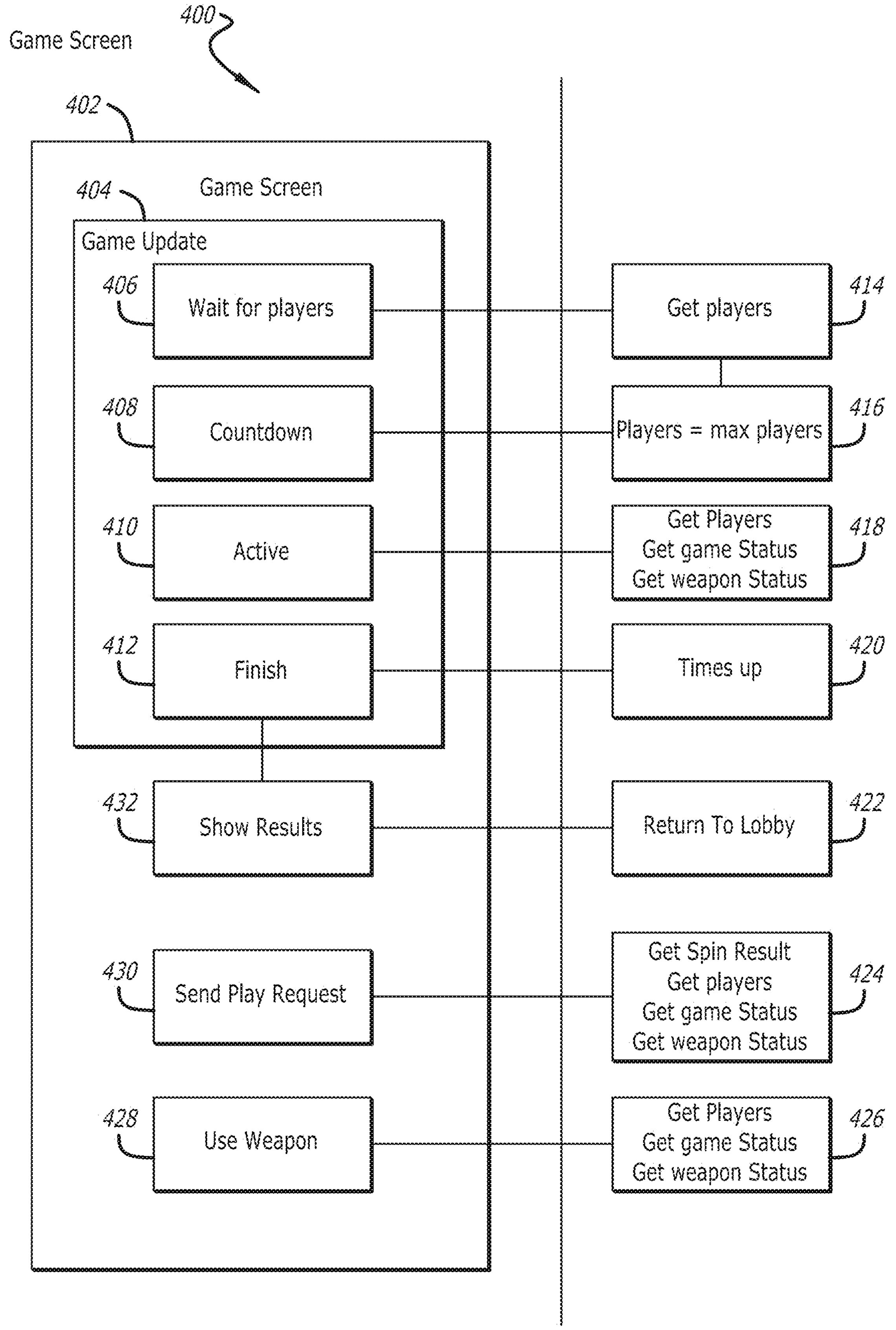
FIG. 4 is a diagram illustrating an example game screen in accordance with some embodiments of the present disclosure.

FIG. 4 is a diagram illustrating an example game screen 400 in accordance with some embodiments of the present disclosure. As illustrated in the figure, a game screen 402 may include a game update 404. The game update 404 may include blocks for waiting for players 406, a countdown 408 to the beginning of the game, an active game 410, and a completed or finished game block 412. The waiting for players block 406 may provide a holding time that allows a game to get players 414. The countdown may provide a maximum time for waiting 416 for a game to begin. Alternatively, if the maximum number of players is reached, the countdown may be bypassed, and the game may begin. In some examples, an active game may get more players even though the game is already in progress. Additionally, an active game may allow players to get a game status or get weapons status 418. In some examples, a game may finish when time is up 420. In other examples games may end based on a completion of a task or a series of tasks. Accordingly, some games may be time based, and some games may be task based. In other examples, a combination of time and tasks may determine the game. When a game is complete, results of the game may be shown 432, and players may return to the lobby 422. In some examples interim scores may also be shown. As illustrated in the example, players may make requests 430 to get spin results, get additional players, get game status, or get weapon status 424. Additionally, use of a weapon may allow one player to engage another player, e.g., challenge or attack another player where one player may affect the score of another player. Players may also get game status and weapon status 426 while using a weapon 428.

Figure 5:
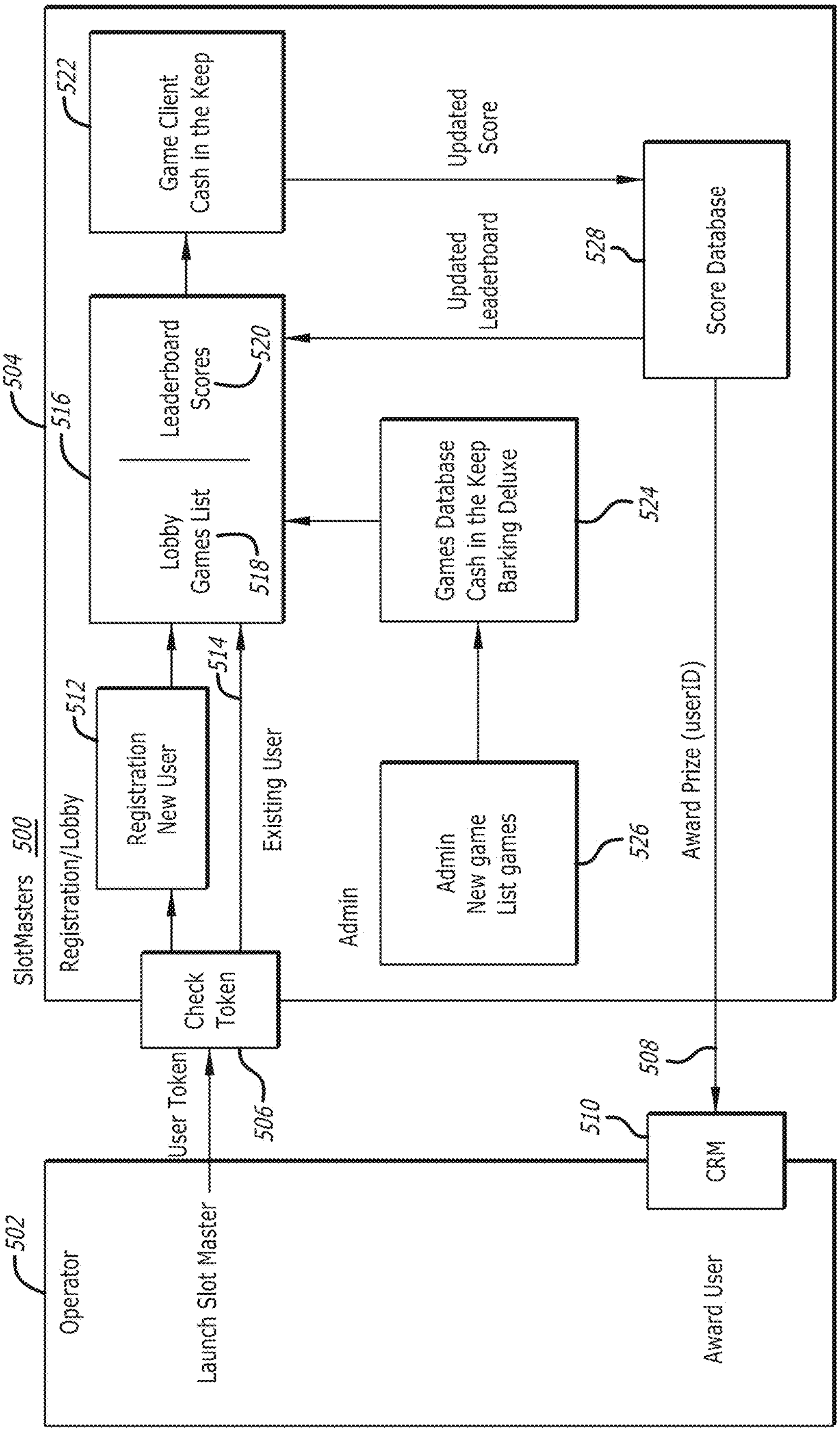
FIG. 5 is a diagram illustrating an example game setup in accordance with some embodiments of the present disclosure.

FIG. 5 is a diagram illustrating an example game setup 500 in accordance with some embodiments of the present disclosure. In the illustrated example functions within the game may include an operator 502 and a registration or lobby 504. The operator may provide user tokens 506 to launch the game. Additionally, the operator may receive user awards 508, e.g., Customer Relationship Management (CRM) 510. Within the registration/lobby, tokens may be received. New users may be registered 512. Additionally, existing users and/or newly registered users may enter the lobby 514. The lobby 516 may include a games list 518 which may allow users to select a game to play. For example, after entering the lobby, new users that have registered or existing users that are already registered may select a game from the list that may be viewable from the lobby. During the game, scores may be tracked on a leaderboard. The lobby may lead to a game client. From the game client, updated scores may be sent to a score database 528 which may in turn update the scores on the leaderboard 520 and provide awards to the CRM. The registration/lobby may include an administrative function 526 that may provide new games and/or a list of games 522. The games may be in a games database 524 and may include, for example, cash in the keep, or barking deluxe, or other appropriate games.

Figure 6:
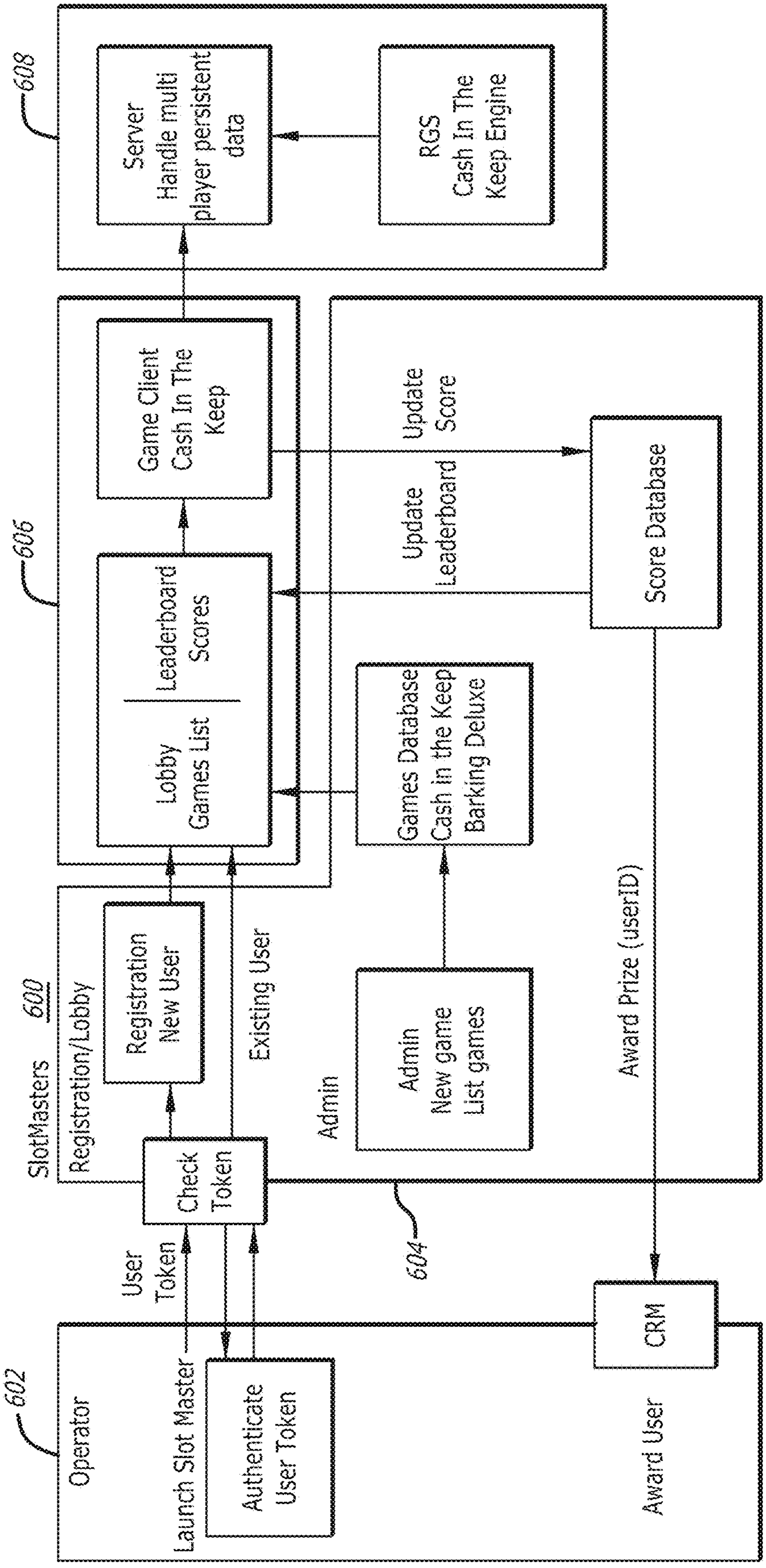
FIG. 6 is a diagram illustrating an example set up in accordance with some embodiments of the present disclosure.

FIG. 6 is a diagram illustrating an example set up 600 in accordance with some embodiments of the present disclosure. The example of FIG. 6 is generally similar to the example of FIG. 5, however more details are illustrated. The example includes an operator block 602 and a registration/lobby block 604. However, in the illustrated example the lobby and game client may be in a separate block 606. Additionally, a server and RGS block may be provided in a separate block 608. The operator block may launch slot master using tokens the tokens may be checked and authenticated within the operator. Checked tokens may allow a new user to register or an existing user to enter the lobby. The new user may enter the lobby once registered. The lobby may include a leaderboard with scores. A user in the lobby may proceed to a game client, e.g., cash in the keep. A server may handle multiplayer persistent data for the game client. The RGS may be coupled to the server and may provide a game engine. The score database may receive scores from the game client and may use those scores to update the leaderboard and provide award prizes through the CRM. Add administrator block may allow for new games and a list of games in a games database.

Figure 7:
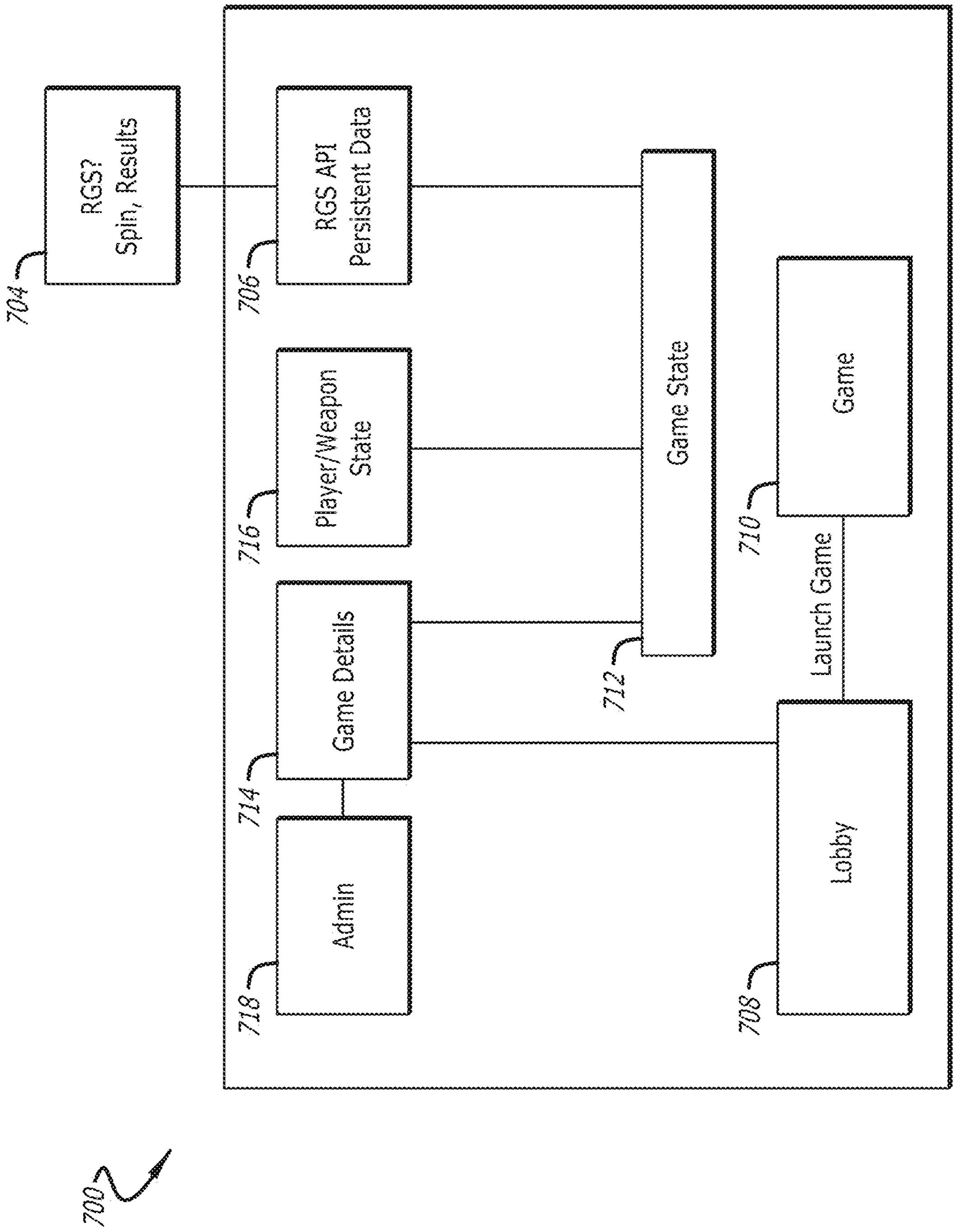
FIG. 7 is a diagram illustrating an example game flow with RGS hosting in accordance with some embodiments of the present disclosure.
Figure 8A:
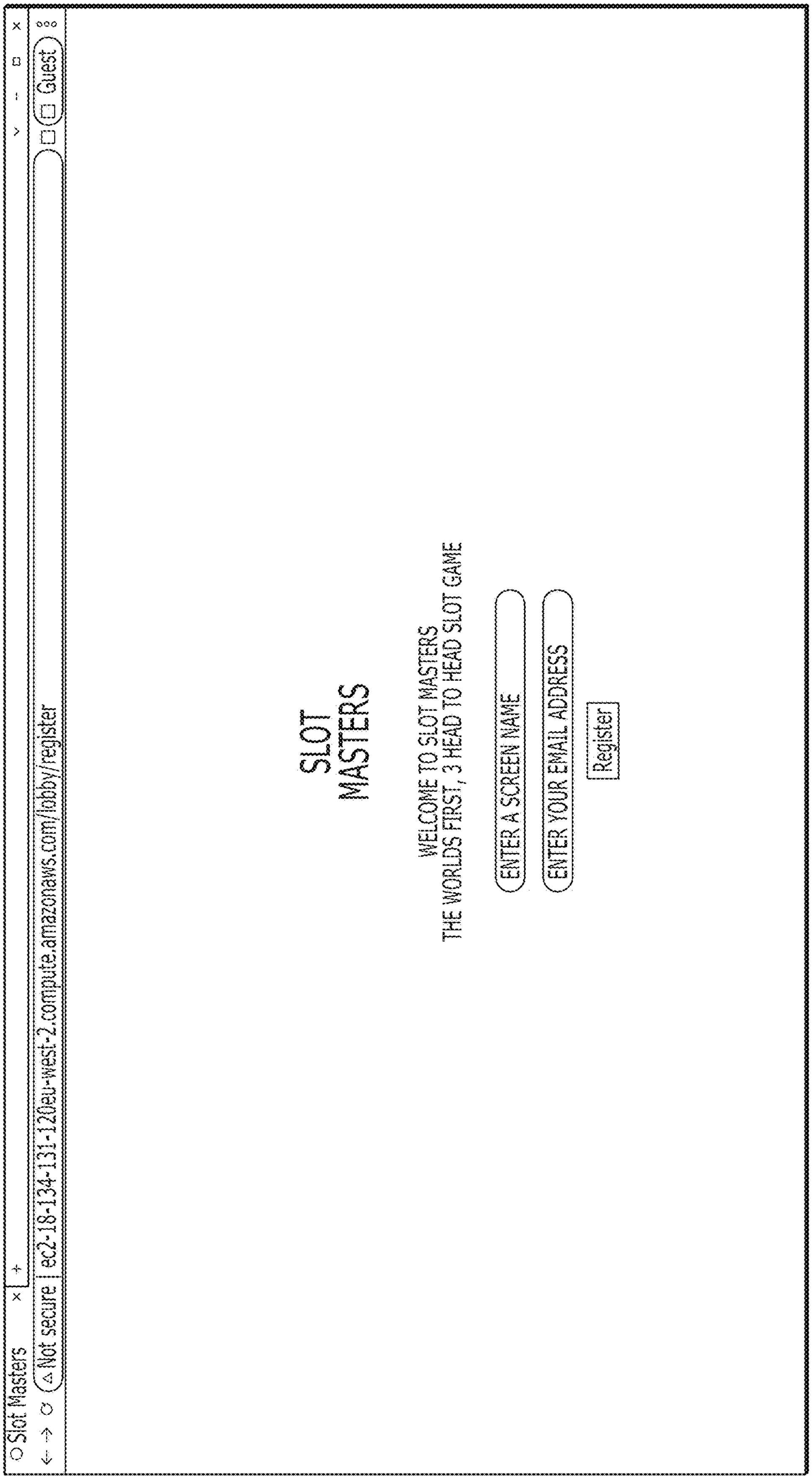
FIGS. 8A-8I illustrate example game screens in accordance with some embodiments of the present disclosure.
Figure 8B:
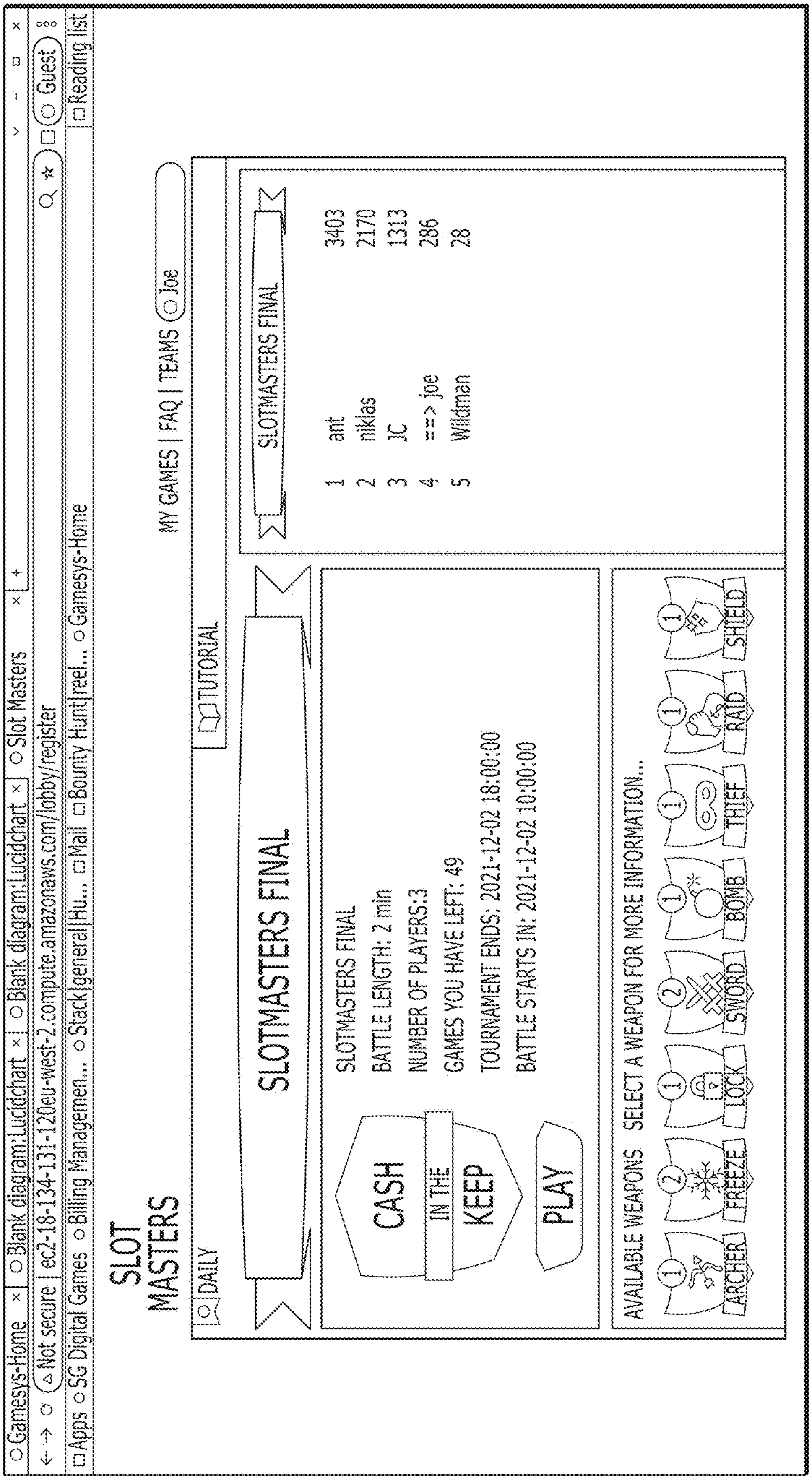
Figure 8C:
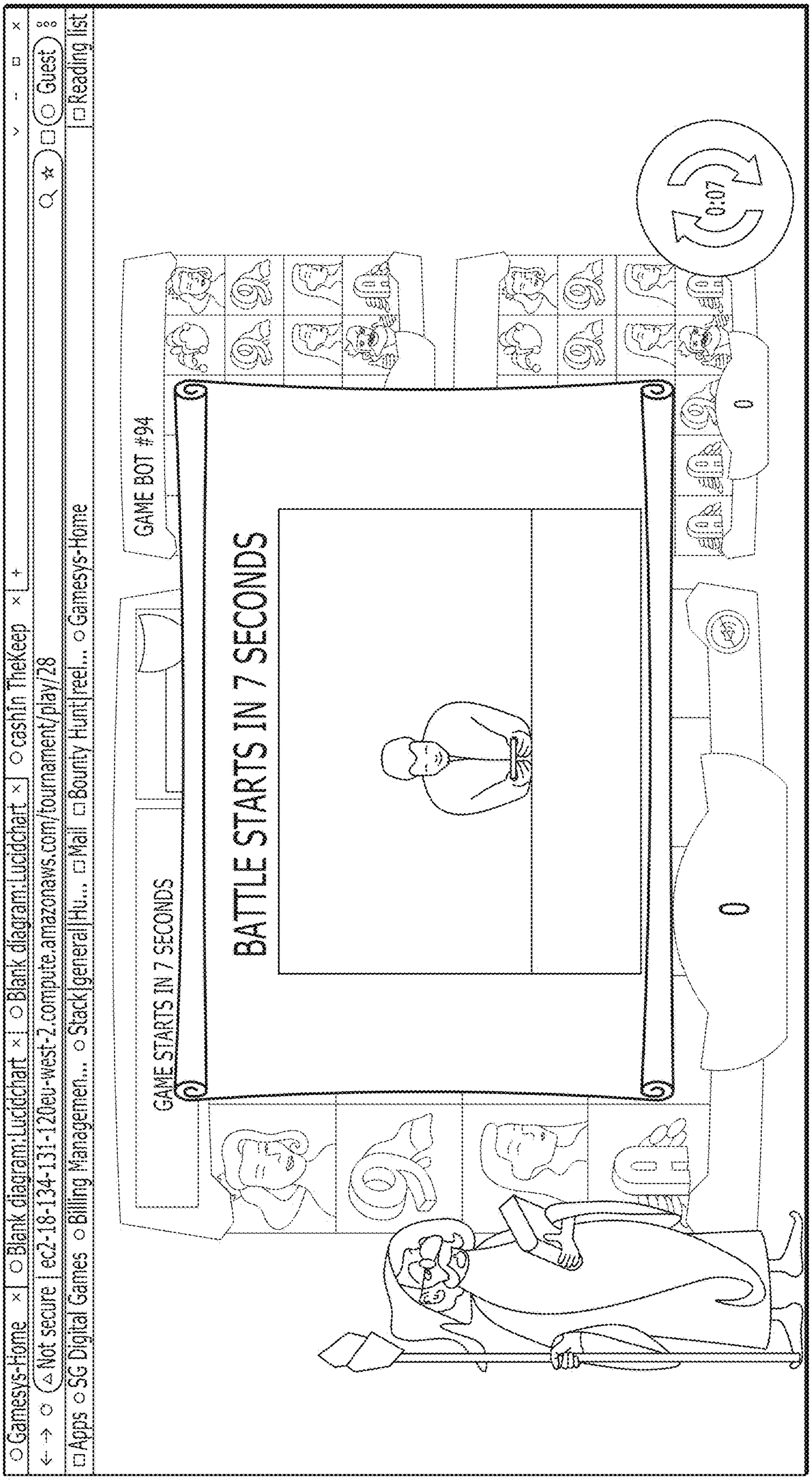
Figure 8D:
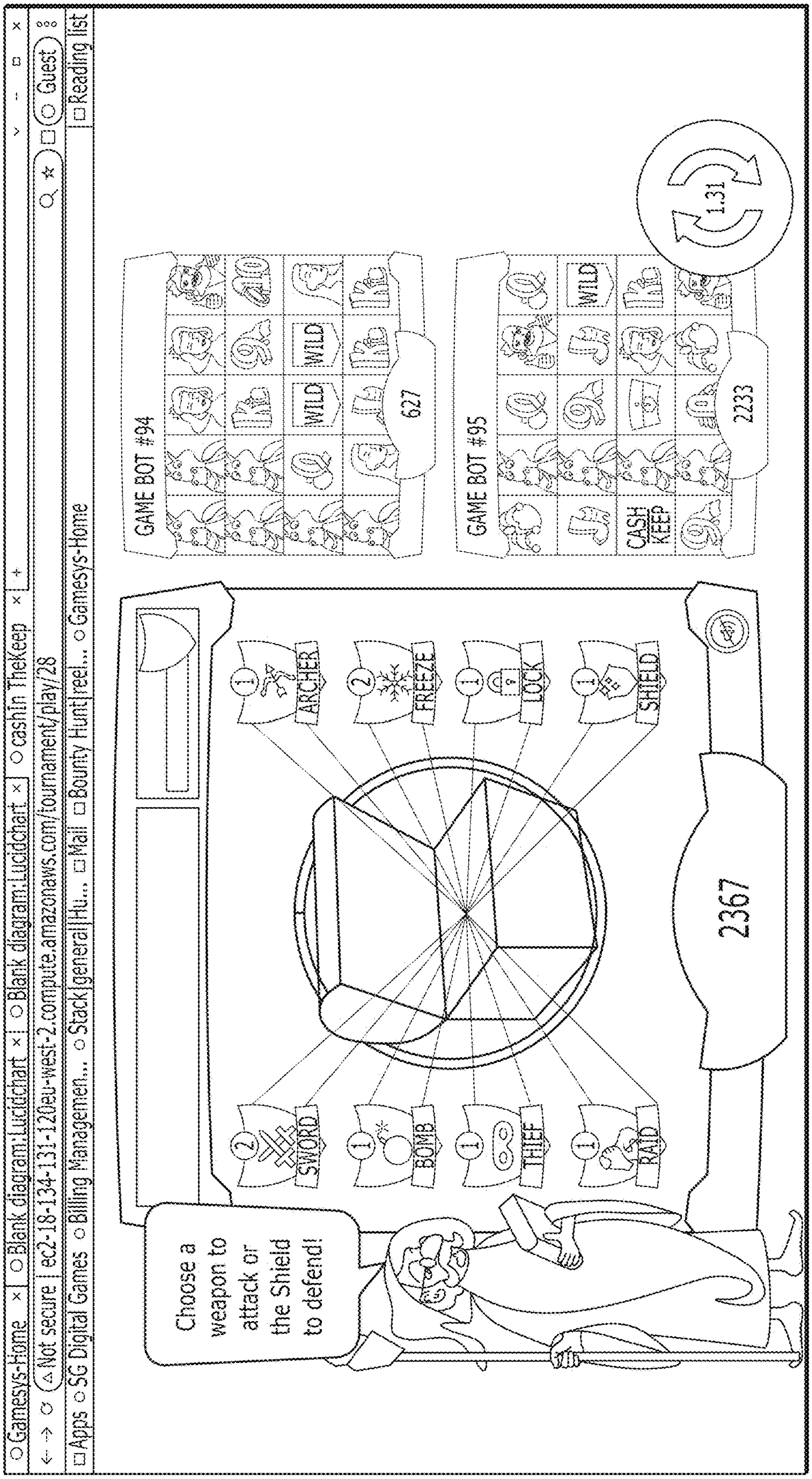
Figure 8E:
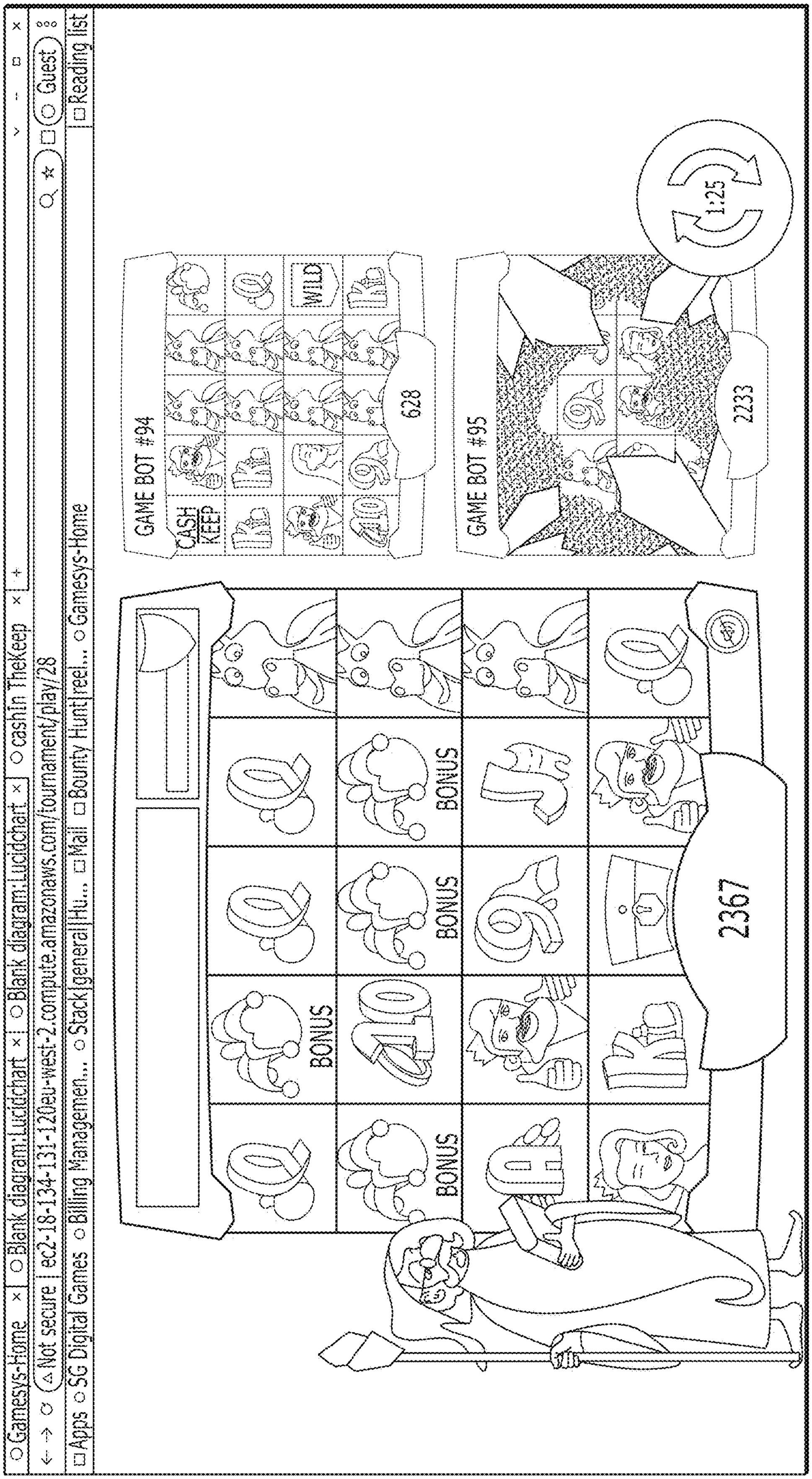
Figure 8F:
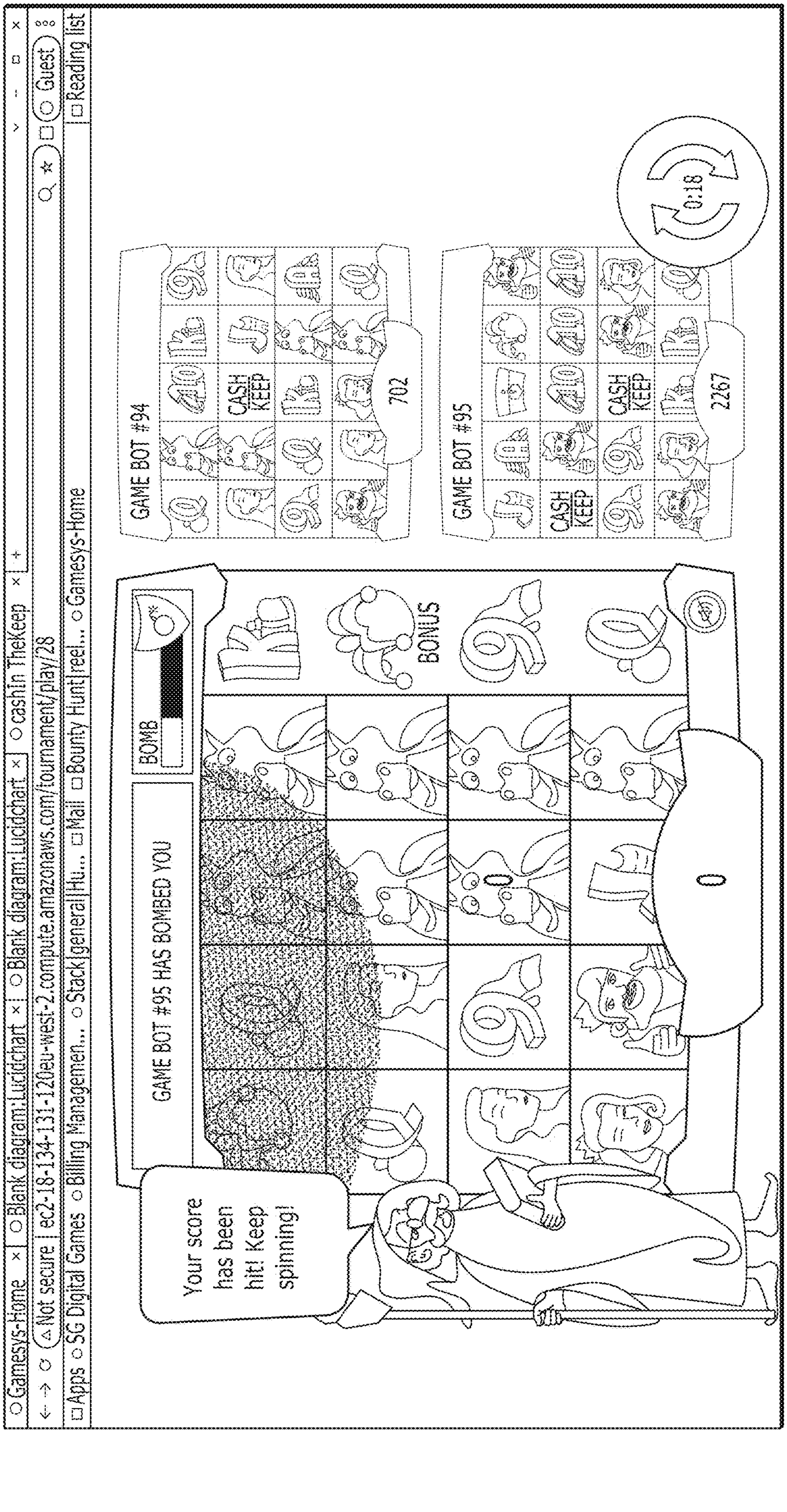
Figure 8G:
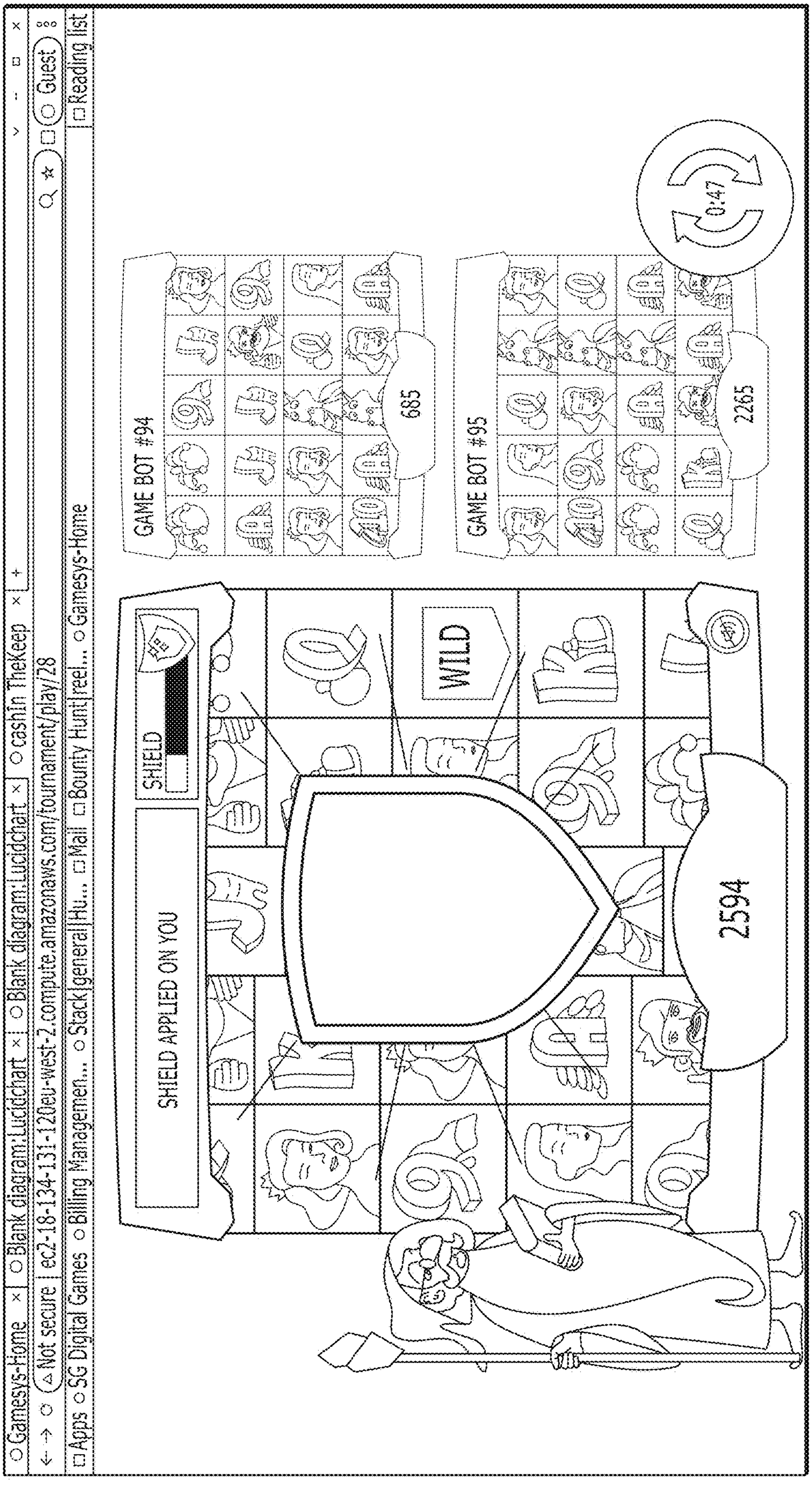
Figure 8H:
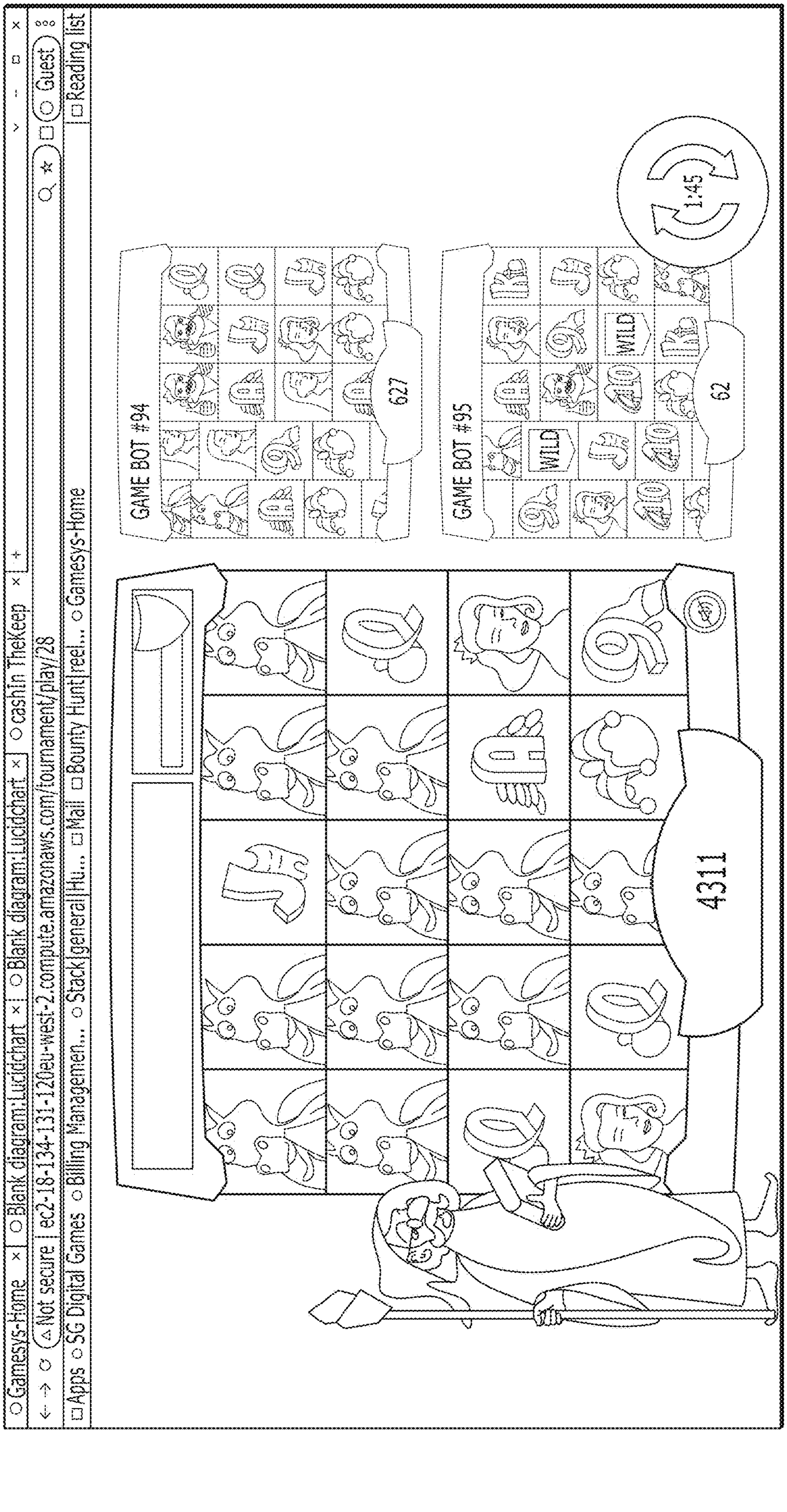
Figure 8I:
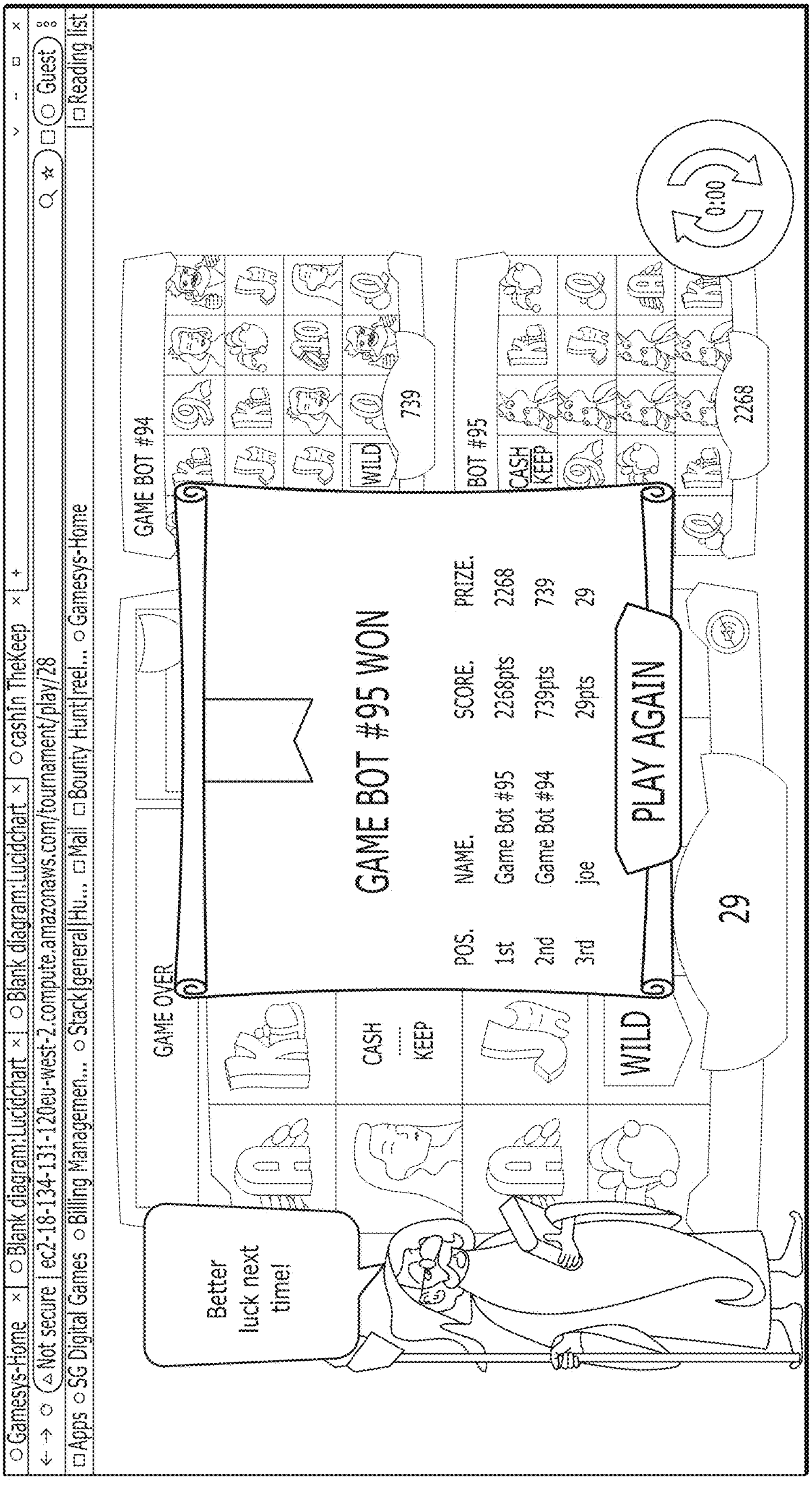

FIG. 7 is a diagram illustrating an example game flow 700 with RGS hosting in accordance with some embodiments of the present disclosure. The example game flow 700 may include a game engine 712 and RGS 704/706 for spins and results. The RGS 704 may be coupled to an RGS API 706 and may include persistent data. As illustrated in the example, a lobby 708 and a game block 710 may be used. Users may enter through the lobby. Additionally, within the lobby the users may receive game details and launch a game. In the illustrated example, the game block may be coupled to the game state 712. The game state 712 may receive game details from the game details block 714 and may allow a player to have a particular weapons state 716. The game details block may interact with the RGS API 706 and persistent data. An administration block 718 may provide for administration of the games.

FIGS. 8A-8I illustrate example game screens in accordance with some embodiments of the present disclosure. The examples in the figure illustrate possible game screens for various aspects of an example game that may incorporate one or more aspects of the systems and methods described herein.

Figure 9:
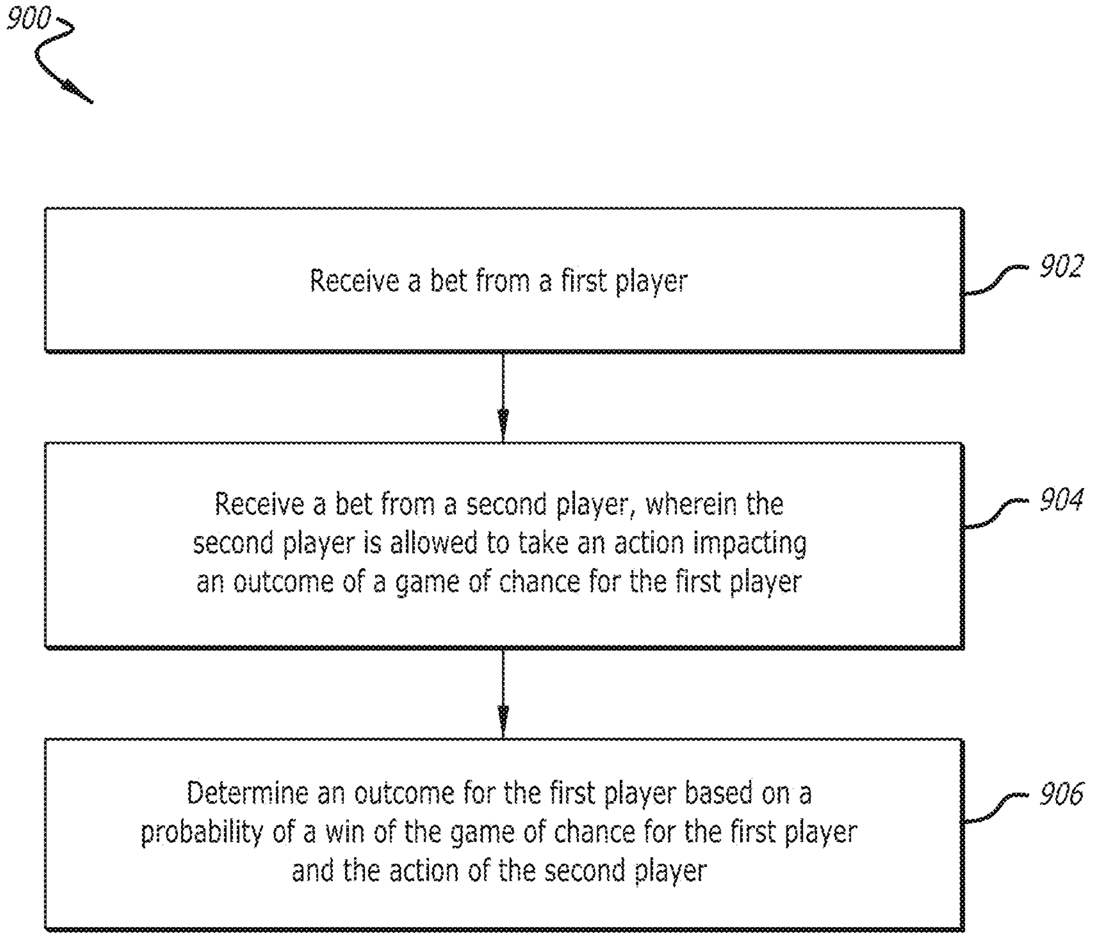
FIG. 9 is a flow diagram illustrating an example method.

FIG. 9 is a flow diagram illustrating an example method 900. The example method 900 is a method 900 within a game of chance. The method 900 includes receiving abet from a first player (902). The method 900 includes receiving a bet from a second player, wherein the second player is allowed to take an action impacting an outcome of a game of chance for the first player (904). The method 900 includes determining an outcome for the first player based on a probability of a win of the game of chance for the first player and the action of the second player (906).

As discussed above, the method 900 includes receiving abet from a first player (902). The bet may be received in cash, by debit card, by credit card, by a casino card including a monetary balance, electronically, e.g., from an electronic device, from an electronic cash application, or by other suitable means. For example, monetary value may be transferred to a gambling device. The method 900 includes receiving a bet from a second player. For example, after money is transferred to a gambling device, that money may be used to places bets when gambling on that gambling device. The second player is allowed to take an action impacting an outcome of a game of chance for the first player (904). The method 900 includes determining an outcome for the first player based on a probability of a win of the game of chance for the first player and the action of the second player (906). Accordingly, players may impact the results of game play of other players using the systems and methods described herein. For example, players may use of a range of offensive and defensive tools. The player may then select that player's tool of choice, from those available. The player may also select an opposing player to use the selected tool against. The available tools offer the player options such as, though not limited to, the ability to either defend against attack from another player, or attack by methods such as: Freezing some or all of another player's game reels for a defined period, completely or partially removing another player's points balance or stealing all or some of another player's balance and adding the balance to the player's own points balance. In some embodiments, a group of players may impact the results of game play of another player of players by working together in a similar way.

One or more of the components, steps, features, and/or functions illustrated in the figures may be rearranged and/or combined into a single component, block, feature or function or embodied in several components, steps, or functions. Additional elements, components, steps, and/or functions may also be added without departing from the disclosure. The apparatus, devices, and/or components illustrated in the Figures may be configured to perform one or more of the methods, features, or steps described in the Figures. The algorithms described herein may also be efficiently implemented in software and/or embedded in hardware.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the methods used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared or otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following disclosure, it is appreciated that throughout the disclosure terms such as "processing," "computing," "calculating," "determining," "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. It will be appreciated that a variety of programming languages may be used to implement the teachings of the invention as described herein.

The figures and the description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats.

Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming.

Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

It is understood that the specific order or hierarchy of blocks in the processes/flowcharts disclosed is an illustration of example approaches. Based upon design preferences, it is iunderstood that the specific order or hierarchy of blocks in the processes/flowcharts may be rearranged. Further, some blocks may be combined or omitted. The accompanying method claims present elements of the various blocks in a sample order and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean “one and only one” unless specifically so stated, but rather “one or more.” The word “exemplary” is used herein to mean “serving as an example, instance, or illustration.” Any aspect described herein as “exemplary” is not necessarily to be construed as preferred or advantageous over other aspects. Unless specifically stated otherwise, the term “some” refers to one or more. Combinations such as “at least one of A, B, or C,” “one or more of A, B, or C,” “at least one of A, B, and C,” “one or more of A, B, and C,” and “A, B, C, or any combination thereof” include any combination of A, B, and/or C, and may include multiples of A, multiples of B, or multiples of C. Specifically, combinations such as “at least one of A, B, or C,” “one or more of A, B, or C,” “at least one of A, B, and C,” “one or more of A, B, and C,” and “A, B, C, or any combination thereof” may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words “module,” “mechanism,” “element,” “device,” and the like may not be a substitute for the word “means.” As such, no claim element is to be construed as a means plus function unless the element is expressly recited using the phrase “means for.”

The invention claimed is:

1. An online electronic slot based gaming system that provides a game space operable on a computer system having an electronic display and at least one processor and a memory coupled to the at least one processor, the at least one processor configured to:

generate a graphical user interface representing a slot based game on the electronic display, wherein the graphical user interface simultaneously shows an array of reels for a first player and an array of reels for a second player that is remote from the first player and an array of reels for a third player that is remote from the first and second players;

define a game session that enables the first and second and third player players to simultaneously initiate spins within a period of time and simultaneously display the status of the spins via the arrays of reels for the first, second, and third players respectively on the graphical user interface, wherein the game session is operably communicable with a remote online lobby that manages communications between the first player, the second player, the third player, and the game session;

receive a request from the first player to initiate a spin of the array of reels for the first player that result in a display in the graphical user interface of a combination of symbols when the spin ends that define and display a first numerical value associated with the combination of symbols for that first player;

receive a request from the second player to initiate a spin of the array of reels for the second player that result in a display in the graphical user interface of a combination of symbols when the spin ends that define and display a second numerical value associated with the combination of symbols for that second player, receive a request from the third player to initiate a spin of the array of reels for the third player that result in a display in the graphical user interface of a combination of symbols when the spin ends that define and display a third numerical value associated with the combination of symbols for that third player;

display and update the first and second and third numerical values in the graphical user interface after each spin initiated by the first and second and third players display an icon of an offensive weapon for the first player such that when clicked by the first player, the icon of the offensive weapon initiates a script that generates an animated graphical opaque overlay on top of the array of reels and freezes the array of reels from spinning for either the second player or the third player and reduces the numerical value associated with either the second player or the third player during the game session; and display an icon of a defensive weapon for the first player such that when clicked by the first player, the icon of the defensive weapon initiates a script that generates an animated graphical shield overlay on top of the array of reels for the first player and prevents another player from reducing the numerical value associated with the first player.

* * * * *